R. H. IRVING.
FUEL VALVE.
APPLICATION FILED JULY 18, 1919.
1,406,191. Patented Feb. 14, 1922.
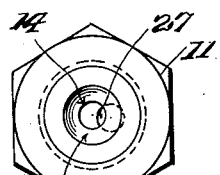
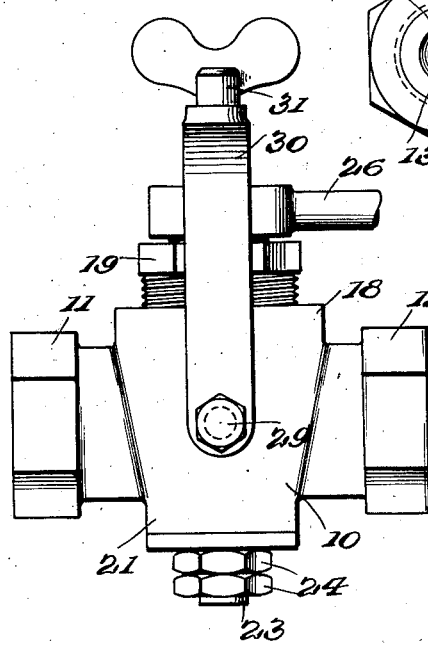
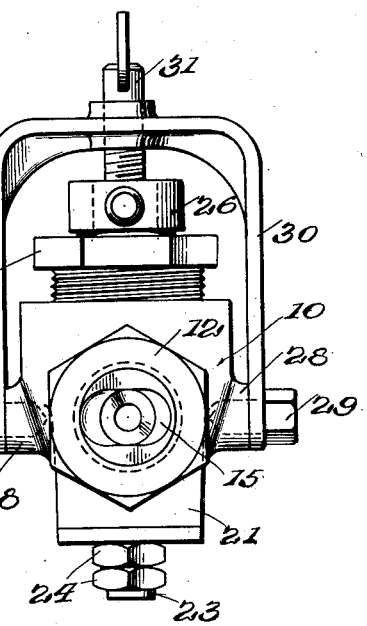
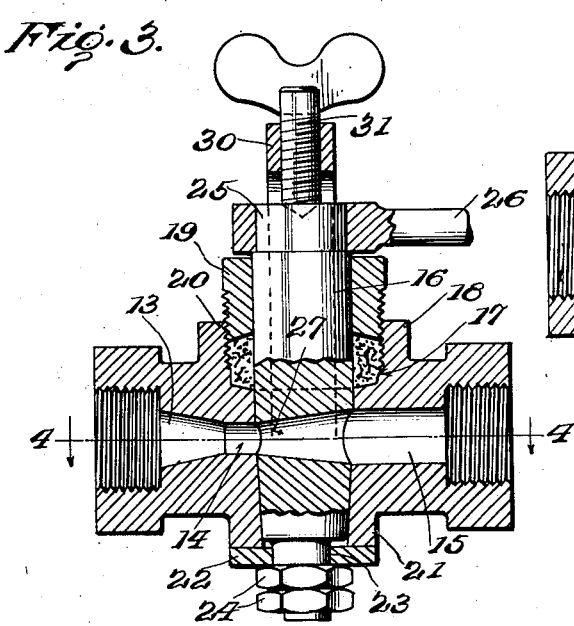
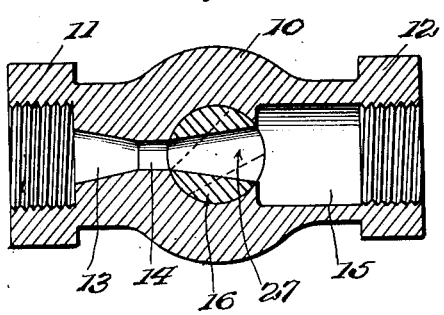
Inventor.
Robert H. Irving
by, Lacey & Lacey
his Atty's

UNITED STATES PATENT OFFICE.

ROBERT H. IRVING, OF GRAMERCY, LOUISIANA.

FUEL VALVE.

1,406,191.  Specification of Letters Patent.  Patented Feb. 14, 1922.

Application filed July 18, 1919. Serial No. 311,699.

*To all whom it may concern:*

Be it known that I, ROBERT H. IRVING, citizen of the United States, residing at Gramercy, in the parish of Saint James and State of Louisiana, have invented certain new and useful Improvements in Fuel Valves, of which the following is a specification.

This invention relates to an improved valve particularly designed for regulating or controlling the flow of liquid or gaseous fuels and has as one of its principal objects to provide a valve which will reduce to a minimum the possibility of stoppage of the valve by the usual foreign matter found in such fuels.

The invention has as a further object to provide a valve wherein flow of fluid through the valve will be accelerated directly at the point where the flow of such fluid is controlled for thus minimizing the possibility of clogging of the valve.

And the invention has as a still further object to provide a valve which may be readily assembled and, if necessary, as easily taken apart for cleaning.

Other and incidental objects will appear hereinafter. In the drawings:

Figure 1 is a side elevation of my improved valve,

Figure 2 is an elevation of the discharge end of the valve,

Figure 3 is a vertical sectional view more particularly illustrating the structural details of the valve, Figure 4 is a horizontal sectional view taken on the line 4—4 of Figure 3 and looking downwardly, and Figure 5 is a detail elevation showing the intake passage of the valve.

In carrying the invention into effect, I employ a valve casing 10 provided at one end with an internally threaded intake nipple 11 and at its opposite end with a similar discharge nipple 12, these nipples being provided, of course, so that the valve may be interposed in a pipe line. Leading from within the nipple 11 is an intake passage which is formed with a substantially frusto conical portion 13 having its smaller end presented inwardly and communicating with a cylindrical portion 14. Opening into the nipple 12 in alinement with the intake passage is a discharge passage 15 which, as particularly brought out in Figure 2 of the drawings, is flattened to extend transversely with respect to the vertical plane of the intake passage. Snugly but rotatably fitted through the valve body is a longitudinally tapered valve plug 16 about the upper end portion of which the valve body is cored out to provide a chamber 17. Surrounding this chamber is an upstanding annular flange 18 into which is threaded a gland 19 compressing a suitable packing 20 within said chamber. Surrounding the lower end portion of the plug is a flange 21 depending from the lower side of the valve body and seating against this flange is a washer 22 loosely surrounding a reduced extension 23 projecting axially from the lower end of the plug. Threaded upon said extension are superposed nuts 24 detachably securing the valve plug in position. At its upper end the valve plug is provided with a reduced preferably hexagonal portion 25 about which is removably engaged a handle or operating lever 26 for the plug. Formed through the plug is a substantially frusto conical passage 27 adapted to register at its smaller end with the portion 14 of the intake passage and at its larger end with the discharge passage 15.

At opposite sides thereof, the valve body 10 is, as particularly shown in Figure 2, provided with lateral bosses 28 into which are removably threaded cap screws 29 and freely mounted to swing upon these cap screws is a yoke 30. Threaded through the transverse or connecting portion of this yoke is a clamp screw 31. This clamp screw is preferably provided with a winged head so that the screw may be easily operated manually and, at its lower end, is pointed to engage within a suitable socket formed axially in the upper end of the valve plug. It will thus be seen that this clamp screw may be operated for tensioning the valve plug within its seat so that possibility of leakage of the valve past the plug may not only thus be easily overcome but also, the freedom of turning movement of the valve may be similarly controlled. Furthermore, this construction provides an arrangement whereby, after the valve plug has, by means of the handle 26, been rotatably adjusted, the clamp screw may be operated for locking the plug in adjusted position. However, it is to be noted that by simply removing the nuts 24 and releasing the clamp screw 31, the valve plug 16 may, after the yoke 30 has been swung to one side, be readily removed. Thus, the valve may be readily assembled or taken apart for cleaning, it being observed that in order to remove the valve plug, as just described, it is unnecessary to displace the gland 19 and packing 20 from the plug.

It is now to be observed that the smaller end of the passage 27 through the valve plug is, as particularly shown in Figure 4, of an area corresponding to the area of the portion 14 of the intake passage of the valve body. Thus, when these passages are in register, a Venturi passage is defined so that fuel passing through the valve will be accelerated in its flow through the restricted portion 14 of the intake passage. At the inner end of this restricted portion of the intake passage, the flow of fuel through the valve will, as will be clear, be controlled by the valve plug. Thus, the fuel will be accelerated in its flow through the valve directly at the point where the flow of fuel is controlled so that the possibility of stoppage of the valve will accordingly be reduced to a minimum, the acceleration in the flow of the fuel tending, of course, to prevent the lodgment of foreign substances at the mouth of the passage 27 through the valve plug. In this connection, it is further to be particularly observed that I provide an arrangement whereby, in proportion to the volume of fuel flowing through the valve, the resistance or obstruction to said flow will, as compared with an ordinary needle valve as now in common use, be greatly reduced. As particularly brought out in Figure 4, the passage 27 of the valve plug will remain in communication with the discharge passage 15 of the valve body regardless of the position of adjustment of the plug for controlling flow through the valve and the portion of the area of the passage 27 in communication with the passage 15 will always be greater than the area of communication between the passage 27 and the portion 14 of the intake passage of the valve body. Thus, obstruction to flow through the valve will occur at one point only and this at the one point where flow through the valve is controlled or, in other words, at the junction of the portion 14 of the intake passage with the passage 27 of the valve plug. Furthermore, the elliptical cross sectional shape of the communicating portions of the passage 27 and the intake passage of the valve body when the valve is partially closed as shown in Figure 5, will as compared with an ordinary needle valve, offer much less resistance to flow through the valve, at the one point where such flow is controlled.

Having thus described the invention, what is claimed as new is:

1. A valve including a valve body having a tapered inlet passage and a discharge passage, and a rotatable valve plug carried by the valve body and provided with an unobstructed Venturi passage therethrough adapted to register at its smaller end with the smaller end of the inlet passage and at its opposite end with the discharge passage.

2. A valve including a valve body having a tapered inlet passage and having a laterally expanded outlet passage axially alined with the inlet passage, a plug rotatably fitted in the valve body and intersecting the axis of the inlet and outlet passages, said plug having an unobstructed Venturi passage therethrough in the axial plane of the inlet and outlet passages of the valve body, the smaller end of said Venturi passage being presented to the smaller end of said inlet passage to establish or cut-off communication therewith and the larger end of said Venturi passage being presented to said outlet passage and being normally in constant communication therewith whereby to maintain such communication although communication with the inlet passage be closed, and means for locking the plug in a set position.

3. A valve including a valve body having alined inlet and outlet passages, a plug rotatably fitted in the body between said passages and controlling the flow therethrough, nuts on the lower extremity of the plug below the body restraining the plug against lifting movement, a gland fitted in the upper side of the body around the plug, the plug having a cylindrical portion extending through the gland and the diameter of said cylindrical portion being the greatest diameter of the plug whereby when the retaining nuts are removed the plug may be withdrawn from the body without disturbing the gland, a yoke pivotally mounted on the sides of the valve body and spanning the upper end of the plug, and a clamping screw mounted in the upper end of the yoke and bearing upon the upper extremity of the plug.

In testimony whereof I affix my signature.

ROBERT H. IRVING. [L. S.]